Jan. 6, 1942.   F. BORCHERT ET AL   2,269,177
ENCLOSED ELECTRIC WIRING SYSTEM
Filed July 18, 1939   2 Sheets-Sheet 1
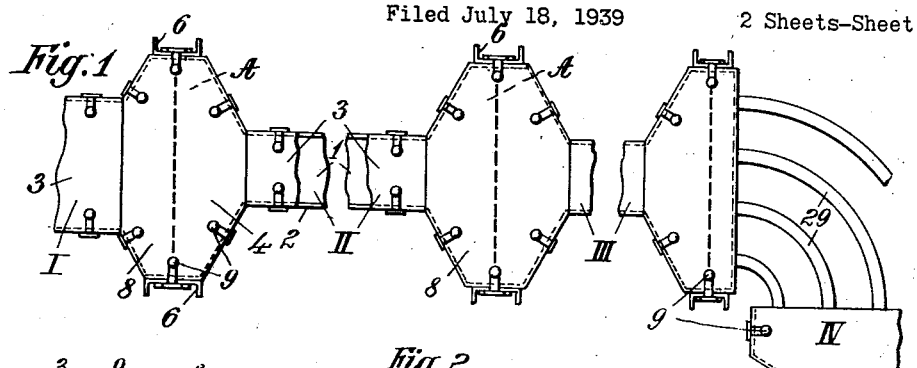
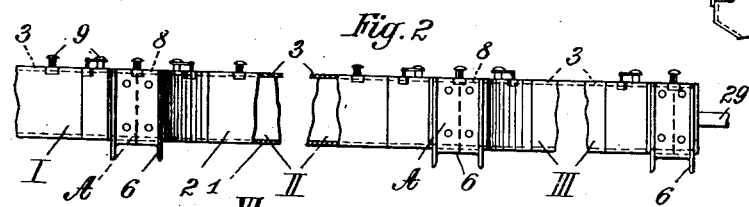
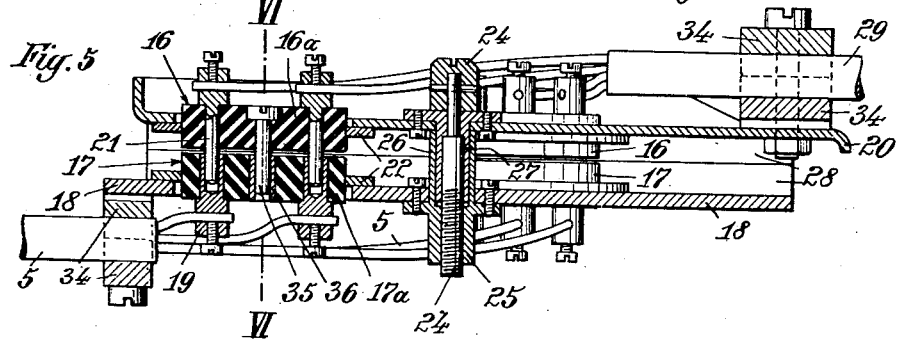
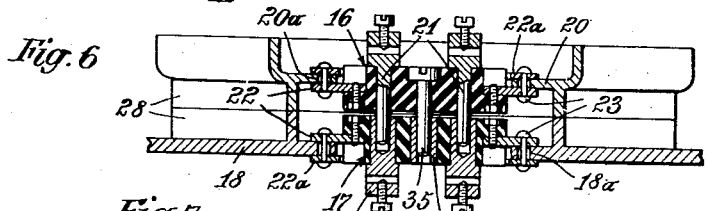
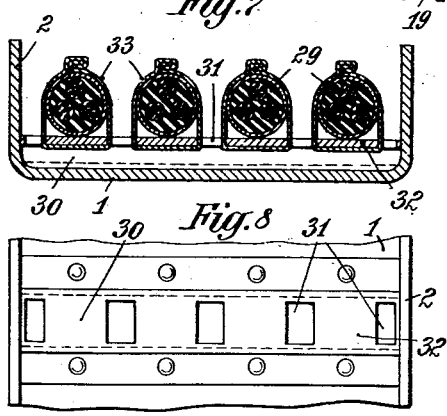
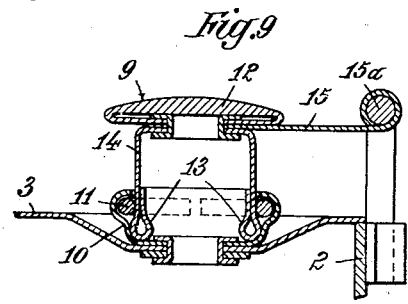
Inventors
F. Borchert
B. Kleindienst
H. Eule
R. Pilz
By Robt & Robb
Attorneys Jan. 6, 1942.  F. BORCHERT ET AL  2,269,177
ENCLOSED ELECTRIC WIRING SYSTEM
Filed July 18, 1939  2 Sheets-Sheet 2
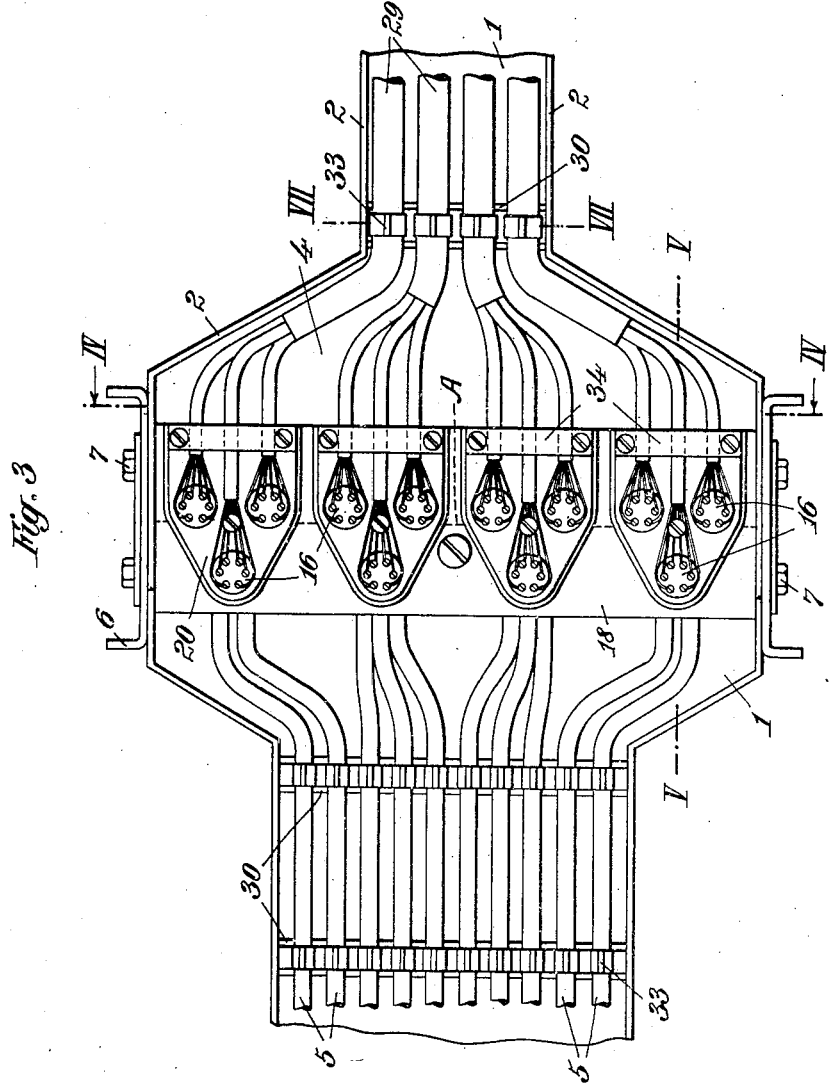
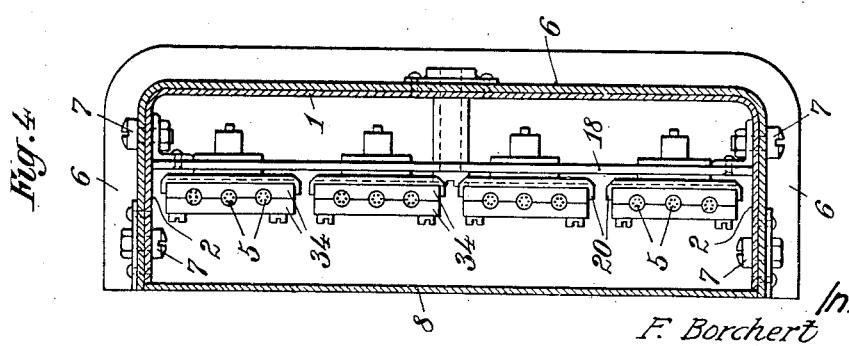
Inventors
F. Borchert
B. Kleindienst
H. Eule
R. Pilz
By Robb & Robb
Attorneys Patented Jan. 6, 1942

2,269,177

UNITED STATES PATENT OFFICE 2,269,177

ENCLOSED ELECTRIC WIRING SYSTEM

Fritz Borchert, Berlin-Britz, Bernhard Kleindienst, Berlin - Niederschoneweide, Helmut Eule, Berlin-Karlshorst, and Richard Pilz, Berlin-Johannisthal, Germany, assignors to the firm Henschel Flugzeug-Werke Aktiengesellschaft, Schonefeld, Kreis Teltow, Germany Application July 18, 1939, Serial No. 285,138
In Germany May 13, 1937

8 Claims. (Cl. 174—88)

This invention relates to enclosed electric wiring systems, particularly for use in aircraft.

The extensive electric wiring required in aircraft for electrically operated or controlled apparatus and instruments is preferably enclosed in specially constructed conduits, so as to obtain a compact and accessible lay-out of the individual conductors. It is known for this purpose to secure the conductors to a base plate which is formed into a conduit by the addition of a detachably secured cover.

The invention has for its object to provide improvements in electric wiring enclosed in conduits of this kind. According to the invention an enclosed electric wiring system is built up of a plurality of interchangeable sections or lengths of conduit and wiring provided with suitable connecting means for joining them together end to end.

The building up of an enclosed wiring system in a plurality of sections joined together at the ends enables the conduit to be installed and dismantled conveniently and rapidly and enables damage to the electric conductors due to hits from projectiles or other causes to be rapidly dealt with by replacement of the damaged sections. Replacement of sections of the conduit may be carried out, without expert assistance, outside the workshop. The individual interchangeable sections may be accurately manufactured in a workshop and suitable quantities thereof kept in stock to form part of a supply of spare parts.

For the purpose of accommodating the means for connecting the ends of the conductor wires at the junctions, the conduit sections are preferably widened at these points to form expanded chambers provided with a cover which is readily detachable, preferably by means of press-button fasteners, for the purpose of giving easy access to the wiring connections. The conduit sections are preferably provided throughout their length with a continuous or subdivided closure cover to facilitate inspection of the cables or wires.

According to a further feature of the invention the conduit is arranged to be secured to suitable supports, for instance members of an aircraft framework, at the junctions between the sections, whereby the work of fitting and dismantling the enclosed wiring system is facilitated and may be carried out very rapidly.

In further development of the invention the cable or wire connections at the junctions between the sections take the form of multiple plug connections the interengaging elements of which are disposed at right angles to the base of the conduit.

This form of construction and arrangement of the cable or wire connecting means enable the dimensions of the conduit to be kept relatively small even with a large number of wires, with consequent saving of a considerable amount of space; and in this way it becomes possible to assemble a larger number of wires in one single conduit and to attach this conduit, for instance to the framework of an aircraft, simply and easily. The advantage thus obtained may be still further increased by using multicore cables and also by using the junctions between sections as distributing boxes.

The invention provides an enclosed electric wiring system, particularly for use in aircraft, by which the establishing of the electrical connection, the arrangement of branched leads and the repairing of damage and faults, is facilitated by the mode of assembly and by the possibility of replacing individual sections, so that breakdowns may be dealt with in a satisfactory manner by non-experts and novices.

An embodiment of the invention is shown by way of example in the accompanying drawings, in which:

Fig. 1 is a ground plan of part of a run of sectional wiring according to the invention, Fig. 2 is a side view of Fig. 1, Fig. 3 is a front view of the interior of the junction between two sections of conduit and wiring, on an enlarged scale, Fig. 4 is a section taken on the line IV—IV of Fig. 3, Fig. 5 is a section taken on the line V—V of Fig. 3, Fig. 6 is a section taken on the line VI—VI of Fig. 5, Fig. 7 is a section taken on the line VII—VII of Fig. 3, Fig. 8 is a plan of Fig. 7, with the cables and attaching strips omitted, and Fig. 9 is a cross-sectional view of a press-button fastener.

Referring to the drawings the wiring system comprising a conduit and wires or cables enclosed therein is built up in sections I, II, III, IV and so forth which are detachably joined together at the junctions A. Each conduit section consists of a lower channel shaped part forming a base plate 1 and side walls 2, and covered by a detachable cover 3 (Fig. 1). At the junctions A the conduit sections are expanded to form chambers 4 in which the means for connecting the ends of the interrupted electric wires 5 or cables 29 are housed. For the purpose of attaching the conduit sections for instance to the framework of an aircraft there are provided flanged members 6 at the junctions, which are adapted to be secured to suitable supports. To the flanged members 6 the conduit sections are detachably secured by means of screws 7. At the same time the flanged members 6 bridge the joint in the conduit so that one flanged member 6 serves for securing two contiguous sections of conduit. In this way the exact position of the conduit sections relatively to each other is defined, when sections are being replaced. Furthermore, the electric wiring connections are relieved of strain due to tension or compression set up by deformation of the aircraft framework. The adjoining chambers 4 of adjacent sections of the conduit are preferably provided with a common cover 8 which is detachably connected to the side of the conduit, and which enables the wiring connections to be exposed for inspection or repair. For holding the detachably provided covers 3 and 8 there may be used press button fasteners 9. In the present example, such a fastener (see Fig. 9) consists of a lower hollow part 10 attached to the cover 3 or 8 in which a spring ring 11 is inserted in a beading, and an upper part 12 consisting of a hollow skirt 14 attached to a thumb-piece 15 and provided with an annular roll or with a beading 13. The bolt 15a of the thumb-piece 15 is fastened to the wall 2 of the conduit. After lifting the upper part of the fasteners the cover 3 or 8 is free for removing.

For the purpose of connecting together the ends of the electric conductors 5, 29 at the junctions of the sections there are used multi-pin plugs 16 and appropriate sockets 17.

The sockets 17 are mounted in a yoke 18 arranged parallel to the base plate 1 in the lower part of a chamber 4 on one end of the conduit section, in such a manner that the plug bushes 19 are disposed at right angles to the base plate 1. The multi-pin plugs 16 at the corresponding end of the wiring section are mounted on a supporting plate 20, a plurality of multi-pin plugs being preferably arranged in a group on one such plate. Fig. 3 shows by way of example three multi-pin plugs mounted on a supporting plate 20. In this way a compact arrangement of the wiring connections is obtained.

To facilitate the proper insertion of the plug pins 21 in the plug bushes 19 the insulators 16a, 17a for the pins 21 and the bushes 19 respectively are mounted on annular members 22 which in their turn are so secured to the supporting plate 20 and the yoke 18, respectively, that the pins and bushes are radially movable to a limited extent in all directions. For this purpose, the pins 21 which are riveted to the members 22 and to other guide members 22a on the other side of the parts 18 and 22 are passed freely through holes 18a, 20a provided in these parts. In this way the two parts of the connecting means are enabled to assume their proper relative positions automatically, when the conductors are being connected up, which is desirable, particularly when the multi-pin plugs are arranged in groups on each supporting plate. To facilitate making and breaking of the connection a thrust screw 24 is provided on the supporting plate 20 of the multi-pin plug and on the yoke 18 there is provided an appropriately screw-threaded sleeve 25. This sleeve is provided with a non-threaded cylindrical portion 26 to guide a smooth portion 27 of the thrust screw 24. The multi-pin plugs 16 are also provided with a guide pin 35 and the sockets 17 with a corresponding guide sleeve 36. The guide pins 35 are longer than the plug pins 31, the portion 27 of the thrust screw 24 having a longer guidance in the portion 26 than the pin 35 in the sleeve 36. By means of this arrangement the parts of the plug connection are separated by movement in an axial direction, with the result that the parts of the connection are saved from undue strain and their separating is facilitated. The same advantage is obtained in establishing the connection. In order to protect the insulators 16a, 17a for the pins 21 and bushes 19 respectively from being damaged or destroyed by being forcibly pressed together, the yoke 18 and supporting plate 20 are provided with ribs 28 which bear against each other before the insulators come together.

If the multi-pin plugs 16 and the corresponding sockets 17 are connected with multi-core cables 29 the advantage is obtained that the conduit may have a relatively small cross-section. The conduit junctions may also be arranged to serve as distributing boxes, for which purpose it is merely necessary to increase the breadth of the adjoining sections of conduit (see Fig. 3). This increase in width may however be kept within narrow limits since the single-core cables may be laid from this point onwards in bundles. The securing of the cables 5 and 29 to the base plate 1 is effected by means of clips 30 which are attached to the base plate and in which, by means of gaps 31, there are formed webs 32 for the engagement of a metal strip 33 adapted to be lapped around the cables.

To relieve the cable or wire connections of tensile strain, terminal clips 34 are provided on the supporting plate 20 and the yoke 18, between which the cables or wires are clamped.

We claim:

1. A standardized enclosed electric wiring unit comprising a length of conduit having a lower part and an upper part of which at least the end portions constitute a movable cover, a section of multi-core wiring in said conduit, a yoke having an opening mounted in said lower part at one end of said conduit and a supporting plate having an opening housed in said upper part at the other end of said conduit, a member slidably mounted on said supporting plate adapted for limited universal radial movement in the opening of said supporting plate, a multi-pin plug secured in said member and having a pin connected to each of said cores, a second member slidably mounted on said yoke, adapted for limited universal radial movement in the opening of the yoke, a plug socket secured in said second member and having a bush connected to each of said cores, said pins and bushes being disposed at right angles to the base of said lower part of the conduit, and readily detachable means for connecting said conduit to the conduit of an adjoining similar standardized wiring unit.

2. A standardized enclosed electric wiring unit comprising a length of conduit having a lower part and an upper part of which at least the end portions constitute a movable cover, a section of multi-core wiring in said conduit, a yoke having an opening mounted in said lower part at one end of said conduit and a supporting plate having an opening housed in said upper part at the other end of said conduit, an annular member slidably mounted on said supporting plate adapted for limited universal radial movement in the opening of said supporting plate, a second annular member slidably mounted on said yoke for limited universal radial movement in the opening of said yoke, a multi-pin plug secured in said first annular member and current-carrying pins severally connected to said cores and a guide pin of greater length than said current-carrying pins, a plug socket secured in said second annular member and having bushes severally connected to said cores and a guide bush positioned for engagement by said guide pin when said plug and socket are assembled, said pins and bushes being disposed at right angles to the base of said lower part of the conduit, and readily detachable means for connecting said conduit to the conduit of an adjoining similar standardized wiring unit.

3. A standardized enclosed electric wiring unit comprising a length of conduit having a channel-section lower part and a complementary upper part of which at least the end portions constitute a movable cover disengageably secured to said lower part, a section of multi-core wiring in said conduit, a yoke mounted in said lower part at one end of said conduit, a supporting plate mounted in said upper part at the other end of said conduit, a plurality of multi-pin plugs mounted on said supporting plate with their pins severally connected to said cores, a tubular flanged member having a shouldered cylindrical socket extending through and attached to said supporting plate, a plurality of plug sockets mounted on said yoke and having their bushes severally connected to said cores, and an internally screw-threaded member extending through and attached to the said yoke in such a position as to be in alignment with the said tubular member of an adjoining similar wiring unit when the plug connections thereof are assembled for engagement by a thrust screw comprising a head adapted to bear against the upper surface of said flange, a smooth shouldered stem adapted to engage in said socket and an externally screw-threaded end portion adapted to engage in said tubular member.

4. A composite plug connection for an electric wiring system comprising a lower supporting member and an upper supporting member having registering apertures therein, an annular member having an internal diameter smaller than said apertures slidably mounted on said supporting members adjacent said apertures, plug and socket members mounted with their insulating bodies in said annular members and extending through said apertures with limited radial play, interengaging guide pins and bushes on said insulating bodies, abutments on said supporting members adapted to bear against each other while said insulating bodies are still distanced from each other when the parts of said plug connection are assembled, means on the said supporting members for exerting force thereon in an axial direction in assembling and separating the part of said connection, and a terminal cable clip mounted at one side of at least one of the said supporting members.

5. In electric wiring systems for aircraft, the combination of a channel having electric wirings disposed within the same, said channel and wirings being cross-sected at common points of division, forming unitary installation sections, the channel sections having provision for affording access to the wirings from without at the points of division of the channel, and the sections of the channel and wirings each having easily releasable means at their opposite ends disposed for attachment to the adjacent ends of corresponding sections through relative movement of the sections in a direction generally transverse to their longitudinal axes, to permit convenient assembly thereof in the form of a wiring circuit for the aircraft, as well as convenient removal or installation of individual sections respecting the wiring circuit, the attachment and detachment of the wiring sections being effected through the places of access to the wirings at the points of division of the channel.

6. In electric wiring systems for aircraft, the combination of a channel having electric wirings disposed within the same, said channel and wirings being cross-sected at common points of division, forming unitary installation sections, each having its ends abutting an end of an adjacent section, and the ends of adjacent channel sections being widened into the form of enlarged chambers open at one side, covers common to the chambers of adjacent sections and removably attached thereto to afford access to the adjoining ends of the wirings, and the sections of the channel and wirings each having easily releasable means at their opposite ends disposed for attachment to the adjacent ends of corresponding sections through relative movement of the sections in a direction generally transverse to their longitudinal axes, to permit convenient assembly thereof in the form of a wiring circuit for the aircraft, as well as convenient removal or installation of individual sections respecting the wiring circuit, the attachment and detachment of the wiring sections being effected at the points of division of the channel when the covers common to adjacent channel sections have been removed.

7. An electric wiring system as defined in claim 6, wherein the bottom and side walls of the channel formed by adjacent installation units are embraced by a member having a generally U-shaped form, which member is attached to the adjacent units so as to bridge the point of division of the channel at the abutting ends of the adjacent chambers, and serves as a means of attachment of the channel to the aircraft structure.

8. An electric wiring system as defined in claim 5, wherein the wirings are of the multi-core type in each installation unit, each wiring section having connection at one of its ends with a multi-pin plug mounted within its installation unit with one pin attached to each core, and the other end of the wiring section of each installation unit having connection with a plug socket also mounted in its installation unit and including a bush attached to each core and adapted to receive one of the pins of the plug in an adjacent installation unit, the pins and bushes of the respective plugs and sockets being disposed with their axes perpendicular to the base of said installation units and being of less height than the height of the channel.

FRITZ BORCHERT.
BERNHARD KLEINDIENST.
HELMUT EULE.
RICHARD PILZ.